US012592501B2

(12) United States Patent
Hosoya et al.

(10) Patent No.: US 12,592,501 B2
(45) Date of Patent: Mar. 31, 2026

(54) TERMINAL BLOCK UNIT

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Yuta Hosoya, Yokkaichi (JP); Daisuke Hashimoto, Yokkaichi (JP); Kentaro Tachi, Yokkaichi (JP); Yoshitomo Tsujii, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 406 days.

(21) Appl. No.: 18/289,056

(22) PCT Filed: Mar. 24, 2022

(86) PCT No.: PCT/JP2022/013964

§ 371 (c)(1),
(2) Date: Oct. 31, 2023

(87) PCT Pub. No.: WO2022/244465

PCT Pub. Date: Nov. 24, 2022

(65) Prior Publication Data

US 2024/0222887 A1 Jul. 4, 2024

(30) Foreign Application Priority Data

May 17, 2021 (JP) ................................ 2021-083118

(51) Int. Cl.
*H01R 9/24* (2006.01)

(52) U.S. Cl.
CPC ................................ *H01R 9/2491* (2013.01)

(58) Field of Classification Search
None
See application file for complete search history.

(56) References Cited

U.S. PATENT DOCUMENTS

2012/0319513 A1 12/2012 Okamoto et al.
2016/0308299 A1 10/2016 Mukuno et al.
2020/0251850 A1 8/2020 Wakimoto

FOREIGN PATENT DOCUMENTS

JP 2008-301544 A 12/2008
JP 2013-131473 A 7/2013
(Continued)

OTHER PUBLICATIONS

May 24, 2022 International Search Report issued in International Patent Application No. PCT/JP2022/013964.

*Primary Examiner* — Ross N Gushi
(74) *Attorney, Agent, or Firm* — Oliff PLC

(57) ABSTRACT

A terminal block unit including: a terminal block; a case having the terminal block disposed thereinside, wherein: the terminal block includes a bus bar, a connection terminal that is separate from the bus bar, and a main body that holds the bus bar and the connection terminal, and the case has an access hole that enables access to the bus bar; and a cover that closes the access hole, wherein: the cover includes a connector disposed inside the cover, and the connector includes a conductive terminal configured to be electrically connected to the connection terminal.

11 Claims, 5 Drawing Sheets

(56) References Cited

FOREIGN PATENT DOCUMENTS

| | | |
|---|---|---|
| JP | 2014-116259 A | 6/2014 |
| JP | 2015-035260 A | 2/2015 |
| JP | 2018-116896 A | 7/2018 |
| JP | 2019-003983 A | 1/2019 |

TERMINAL BLOCK UNIT

BACKGROUND

The present disclosure relates to a terminal block unit.

JP 2008-301544A discloses a terminal block unit including a case and a terminal block. The terminal block includes a composite connector. The composite connector is formed by integrating a power connector and a signal connector into a single piece. The power connector is connected to a power cable. The signal connector is connected to the signal cable. The power cable and the signal cable are accommodated inside the case. The terminal block unit is also disclosed in JP 2011-187224A and JP 2015-125865A.

SUMMARY

The signal connector includes a hood protruding to a side opposite to a side on which the signal connector is connected to the signal cable. A counterpart connector used in a pair with the signal connector is fitted to the hood. If the case is structured to cover the hood as well, providing a space for accommodating the counterpart connector inside the case results in an increase in size of the case.

Therefore, an exemplary aspect of the disclosure provides a terminal block unit that can suppress an increase in size of a case.

A terminal block unit according to the present disclosure is a terminal block unit including: a terminal block; a case having the terminal block disposed thereinside, wherein: the terminal block includes a bus bar, a connection terminal that is separate from the bus bar, and a main body that holds the bus bar and the connection terminal, and the case has an access hole that enables access to the bus bar; and a cover that closes the access hole, wherein: the cover includes a connector disposed inside the cover, and the connector includes a conductive terminal configured to be electrically connected to the connection terminal.

According to the present disclosure, it is possible to provide a terminal block unit that can suppress an increase in size of a case.

DETAILED DESCRIPTION OF EMBODIMENTS

Figure 1:
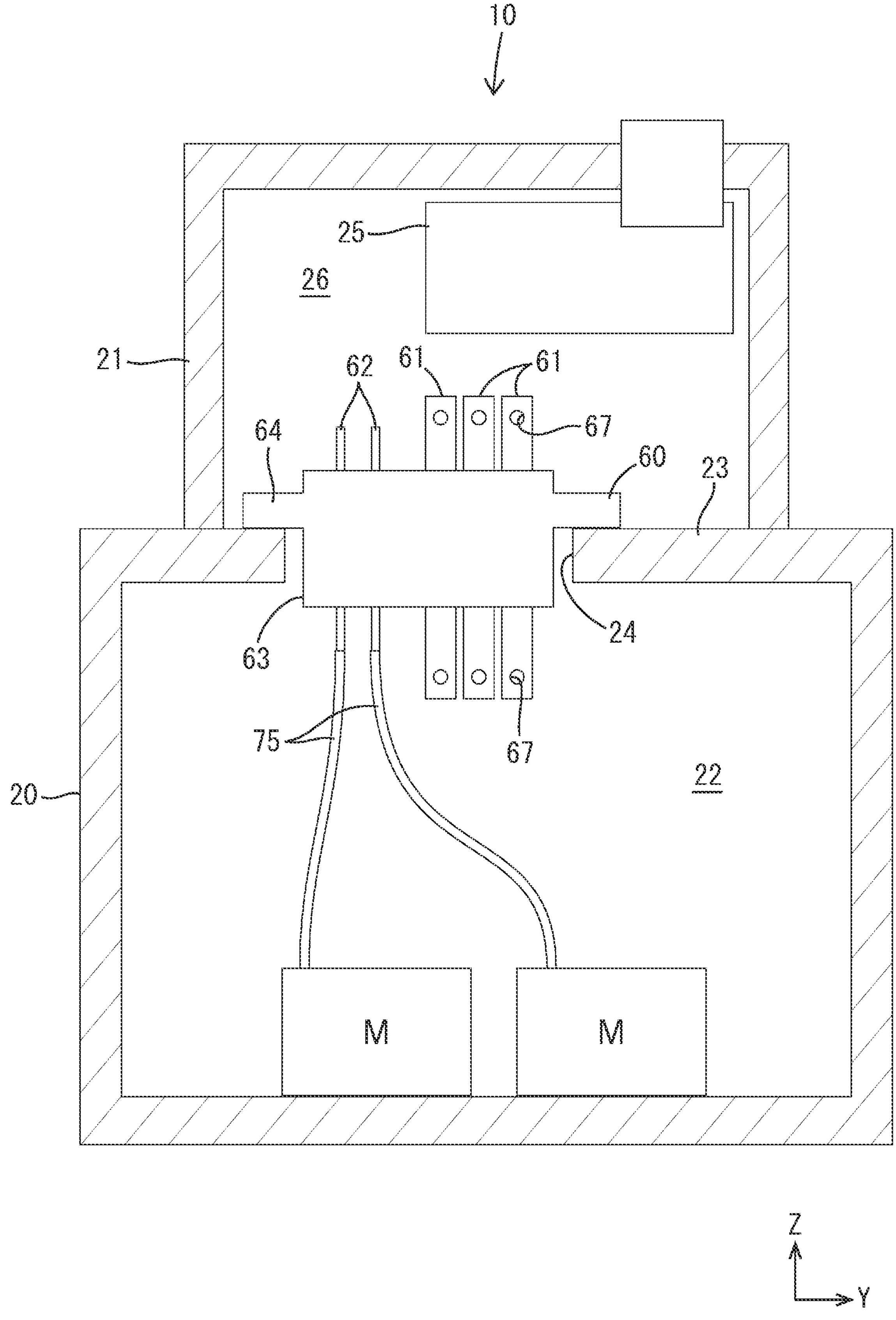
FIG. 1 is a schematic cross-sectional view of a terminal block unit according to Example 1 of the present embodiment as viewed from the front.

Description of Embodiments of the Present Disclosure

First, aspects of the present disclosure will be listed and described.

(1) A terminal block unit according to the present disclosure is a terminal block unit including: a terminal block; and a case having the terminal block disposed thereinside, wherein the terminal block includes a bus bar, a connection terminal that is separate from the bus bar, and a main body that holds the bus bar and the connection terminal, the case has an access hole that enables access to the bus bar, the terminal block unit further includes a cover that closes the access hole, the cover includes a connector disposed inside the cover, and the connector includes a conductive member configured to be electrically connected to the connection terminal.

With the above-described configuration, the connector is disposed inside the cover, and it is therefore not necessary to secure a space for accommodating the entire connector inside the case. Consequently, it is possible to realize space saving for the case, thus suppressing an increase in size of the case.

In addition, the connector is disposed so as to correspond to the access hole that enables access to the bus bar, and it is therefore not necessary to provide a dedicated hole through which the connector is inserted into the case, thus preventing an increase in complexity of the structure of the case.

(2) Preferably, the case includes a first case that supports the main body, and a second case having the access hole formed therein, and the second case is fixed to the first case while covering the main body.

With the above-described configuration, the second case can be fixed to the first case after the main body has been supported by the first case, and it is possible to increase the ease of assembly.

(3) The first case may have an opening in an attachment wall to which the second case is fixed, the main body may be disposed through the opening, and the connection terminal may have a first end portion configured to be connected to wiring accommodated in the first case, and a second end portion configured to be electrically connected to the conductive member.

With the above-described configuration, the connection terminal is shaped so as to extend from the first end portion to the second end portion in a direction extending through the opening of the attachment wall, and it is therefore possible to reduce the overall length of the connection terminal.

(4) The connection terminal may have an L-shape extending through the main body, and the second end portion may be disposed opposite the access hole while being exposed from the main body.

With the above-described configuration, the second end portion of the connection terminal can be connected to the conductive member at the same time as the connector is passed through the access hole. In addition, the connection terminal has an L-shape, and therefore, for example, wiring connected to the first end portion of the connection terminal can be disposed in a direction extending along the wall surface of the attachment wall, thus effectively utilizing the space in the first case.

(5) The second case may have a smaller outer shape than the first case.

With the above-described configuration, the first case is larger than the second case. If an insertion hole for the connector is formed in a large first case, the first case is designed taking the generation of cavities into consideration. Accordingly, the opening diameter of the insertion hole is increased.

However, for the above-described configuration, the access hole that may be an insertion hole for the connector is formed in the second case having a small size, and it is therefore not necessary to form an insertion hole having a large opening diameter in the first case. Consequently, it is also not necessary to attach a connector or sealing member having a large size to the first case.

(6) The connector may be disposed through the access hole in a front-rear direction, the conductive member may be connected to a connection portion on the connection terminal in the front-rear direction, and at least one of the conductive member and the connection portion on the connection terminal may be disposed so as to be displaceable in a direction intersecting the front-rear direction.

When the connector is passed through the access hole, at least one of the conductive member and the connection portion is displaced in the direction intersecting the front-rear direction so as to easily reach a position at which the conductive member and the connection portion can be electrically connected to each other. Note that the connection portion on the connection terminal may be a connection terminal itself that is directly connected to the conductive member, or may be a relay connection portion such as a counterpart terminal that is interposed between the connection terminal and the conductive member.

(7) An elastic member that is elastically deformable in the direction intersecting the front-rear direction may be disposed between the connector and an inner circumference of the access hole in the case. With the above-described configuration, elastic deformation of the elastic member allows the conductive member to be displaced in the direction intersecting the front-rear direction so as to reach a position at which it can be electrically connected to the connection portion. The elastic member can also have the function of providing a seal between the case and the connector.

(8) The connector may include: a terminal holding portion that holds the conductive member; a housing having the terminal holding portion disposed thereinside; and a displacement allowing portion that is provided between the terminal holding portion and the housing, and that allows the terminal holding portion to be displaced in the direction intersecting the front-rear direction.

With the above-described configuration, the conductive member can be displaced together with the terminal holding portion, and it is therefore possible to determine the mode of displacement of the conductive member within an allowable range of the displacement allowing portion.

(9) The connection portion on the connection terminal side may be accommodated in a counterpart housing serving as a fitting counterpart of the connector, and a retainer that holds the counterpart housing so as to be displaceable in the direction intersecting the front-rear direction may be attached to the main body.

With the above-described configuration, the connection portion on the connection terminal side can be displaced in the direction intersecting the front-rear direction, together with the counterpart housing, and it is therefore possible to determine the mode of displacement of the connection portion on the connection terminal side between the retainer and the main body.

(10) The connection portion on the connection terminal side may be a counterpart terminal that is to be accommodated in the counterpart housing, and the counterpart terminal may be connected to the connection terminal via a flexible wire.

With the above-described configuration, the flexible wire can be deformed when the counterpart terminal is displaced in the direction intersecting the front-rear direction, and it is therefore possible to suppress a stress caused by displacement of the counterpart terminal from being exerted on the connection terminal.

(11) A connection portion on the connection terminal side to the conductive member may be disposed opposite the access hole.

With the above-described configuration, the connection portion on the connection terminal side and the conductive member can be brought to be connectable to each other at the same time as the connector is passed through the access hole. Consequently, an operation of passing the connector through the access hole, and an operation of connecting the connection portion on the connection terminal side and the conductive member to each other need not be performed separately, thus making it possible to increase the ease of assembly.

DETAILS OF EMBODIMENTS OF THE PRESENT DISCLOSURE

Specific examples of embodiments according to the present disclosure will be described below with reference to the drawings. It should be noted that the present disclosure is not limited to these examples, but is defined by the claims, and is intended to include all modifications which fall within the scope of the claims and the meaning and scope of equivalents thereof.

Example 1

Figure 2:
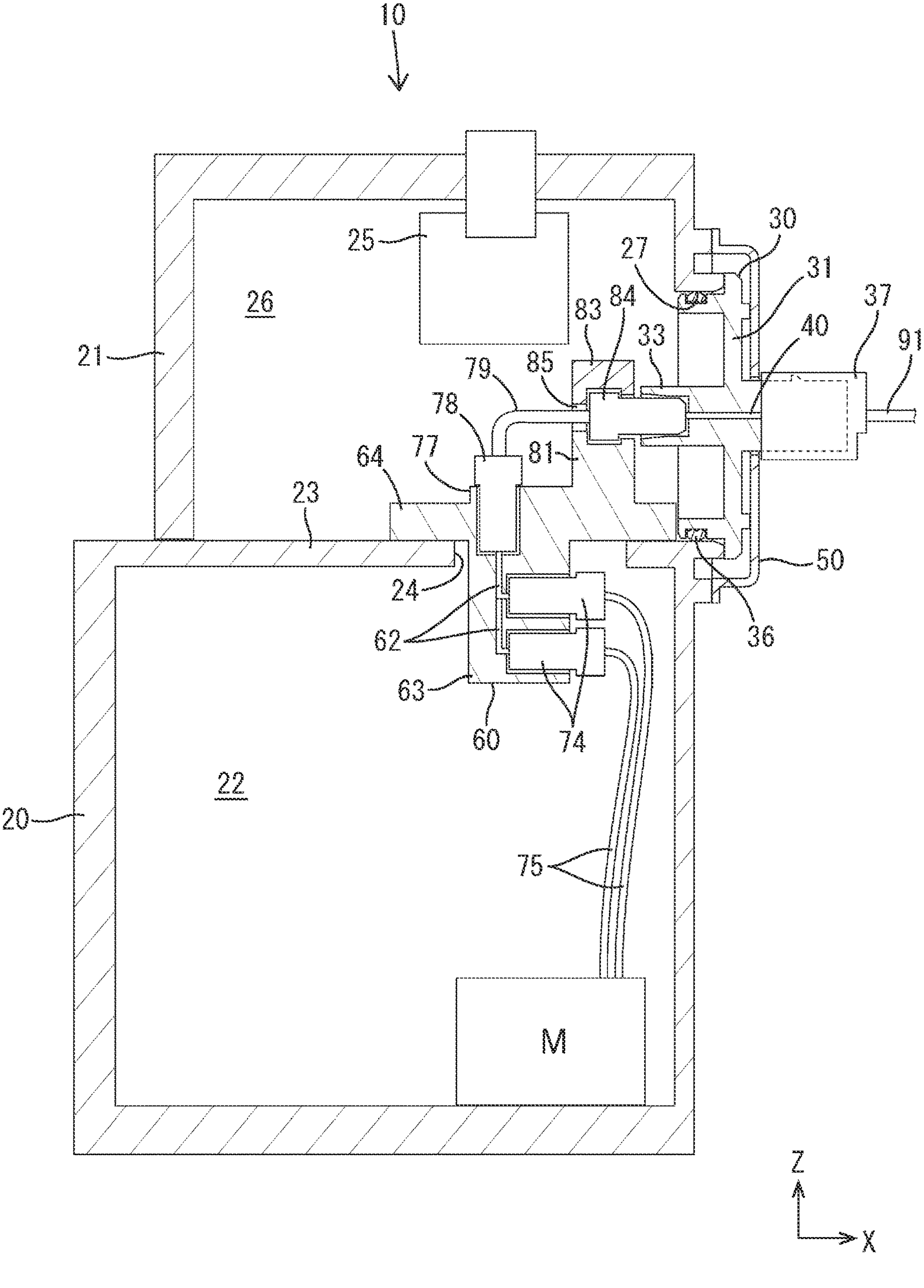
FIG. 2 is a schematic cross-sectional view of the terminal block unit as viewed from the side.

Example 1 of the present embodiment illustrates a terminal block unit 10 that is mounted in a vehicle such as an electric automobile and a hybrid automobile. As shown in FIG. 2, the terminal block unit 10 includes cases 20 and 21, a terminal block 60 disposed in the cases 20 and 21, a cover 50 attached to the cases 20 and 21, and a connector 30 disposed inside the cover 50. The cases 20 and 21 include a first case 20 serving as a motor case that accommodates motors M, and a second case 21 serving as an inverter case that accommodates an inverter (not shown). A hydraulic fluid such as an Automatic Transmission Fluid (ATF) oil is stored in the first case 20. The terminal block 60 serves to connect the motors M to the inverter, and, as shown in FIG. 1, includes bus bars 61 for power supply, and connection terminals 62 that are separate from the bus bars 61. Examples of the connection terminals 62 include temperature detecting thermistor terminals that detect the coil temperature of the motors M.

As for directions of the terminal block unit 10 in the following description, a vertical direction is defined based on the vertical direction in the drawings. The vertical direction corresponds to, but is not limited to, a vertical direction in a state in which the terminal block unit 10 is mounted in the vehicle. An upper side is a side on which the second case 21 is disposed relative to the first case 20. A lateral direction is defined based on the lateral direction in FIG. 1. The lateral direction corresponds to a direction in which the bus bars 61 and the connection terminals 62 are disposed side by side in the terminal block 60. A front-rear direction is defined based on the lateral direction in FIG. 2. The front-rear direction corresponds to a direction in which the cases 20 and 21 are coupled to the cover 50. A front side is a side on which the cover 50 is located relative to the second case 21. In the drawings, an X direction indicates the front-rear direction, a Y direction indicates the lateral direction, and a Z direction indicates the vertical direction.

First Case

The first case 20 is made of metal such as an aluminum alloy, and has the shape of a tube or box with closed lateral sides. As shown in FIGS. 1 and 2, the first case 20 is provided with a first accommodating space 22 that accommodates the motors M and wiring 75 extending from the motors M. The first case 20 includes an attachment wall 23 at an upper portion thereof. The attachment wall 23 has an opening 24. The opening 24 extends in a vertical direction, which is the thickness direction of the attachment wall 23, and has an upper end in communication with a second accommodating space 26, which will be described later, of the second case 21, and a lower end in communication with the first accommodating space 22 of the first case 20.

Terminal Block

Figure 4:
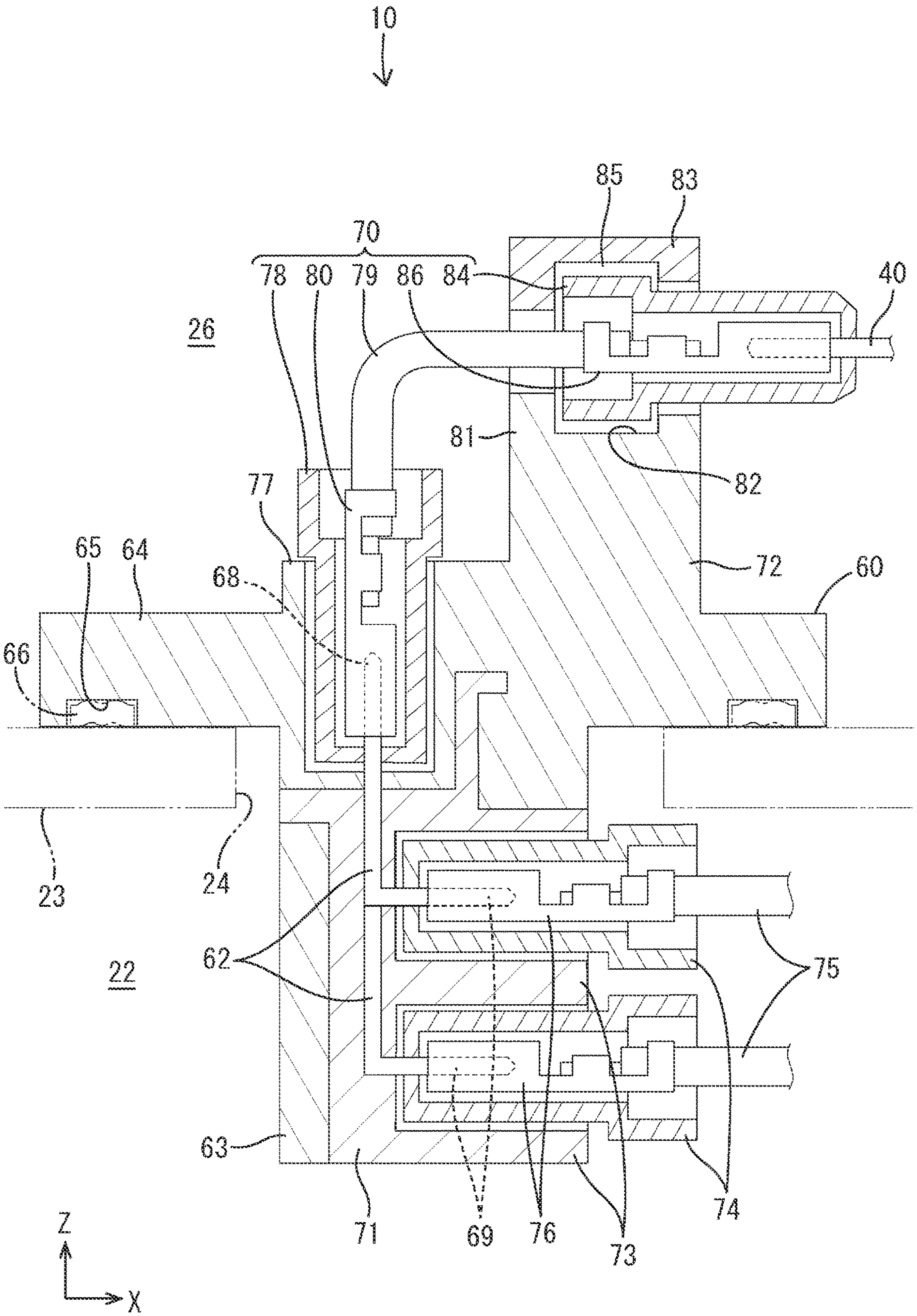
FIG. 4 is an enlarged cross-sectional view showing a state in which a terminal block is supported on an attachment wall of a first case, and connection terminals and a conductive member are electrically connected to each other via a relay connector portion.

The terminal block 60 includes a main body 63 that is made of synthetic resin, and that holds the bus bars 61 and the connection terminals 62. The main body 63 is attached to and supported on the attachment wall 23 while extending through the opening 24. The main body 63 includes a collar portion 64 that is fixed to an upper surface of the attachment wall 23. As shown in FIG. 4, an annular groove 65 is formed in a lower surface of the collar portion 64. A sealing ring 66 is attached to the annular groove 65. The sealing ring 66 provides a seal between the collar portion 64 of the main body 63 and the attachment wall 23

As shown in FIG. 1, three bus bars 61 are held by the main body 63 so as to be arranged side by side in the lateral direction. Each of the bus bars 61 is a plate-shaped conductor that extends in the vertical direction, and is insert molded to the main body 63 with a plate surface thereof facing the front-rear direction. An upper portion of the bus bar 61 protrudes from the main body 63 into the second accommodating space 26. A lower portion of the bus bar 61 protrudes from the main body 63 into the first accommodating space 22. A fixing hole 67 is formed in each of the upper and lower portions of the bus bar 61. Fixing holes 67 are also formed in counterpart bus bars provided in the inverter (not shown).

The upper portion of each of the bus bars 61 and the corresponding counterpart bus bar are placed on top of each other in the plate thickness direction, and a bolt is passed through the respective fixing holes 67 of both bus bars and fastened to a nut, whereby the bus bar 61 and the counterpart bus bar are electrically connected to each other. Similarly, each of the bus bars 61 and the corresponding conductor (not shown) on the motor M side are also fastened to each other via a bolt passed through the fixing hole 67 formed in the lower portion of the bus bar 61, and thus are electrically connected to each other.

Two connection terminals 62 are held by the main body 63 so as to be arranged side by side in the lateral direction at positions adjacent to the bus bars 61. Each of the connection terminals 62 is an overall elongated, pin-shaped or plate-shaped conductor, and is insert molded to the main body 63. Note that, for the sake of convenience, the two connection terminals 62 are shown vertically protruding from the terminal block 60 in FIG. 1 in order to clearly show the positional relationship between the bus bars 61 and the connection terminals 62. However, to be precise, in Example 1, the two connection terminals 62 are disposed inside the terminal block 60, as will be described later.

As shown in FIG. 4, each of the connection terminals 62 is substantially L-shaped in a side view, and has a portion extending in the vertical direction through the opening 24, and a portion extending in the front-rear direction on the first case 20 side. An upper end portion of the connection terminal 62 is formed as a second end portion 68 protruding from the main body 63 into the second accommodating space 26. The second end portion 68 is electrically connected to a conductive member 40 (conductive terminal), which will be described later, via a relay connector portion 70. A lower front end portion of the connection terminal 62 is formed as a first end portion 69 protruding from the main body 63 into the first accommodating space 22 of the first case 20.

The main body 63 includes a primary molded portion 71 that covers a portion of the connection terminal 62 that is located toward the first end portion 69, and a secondary molded portion 72 that covers a portion of the connection terminal 62 that is located toward the second end portion 68. The primary molded portion 71 is formed by primary insert molding using the connection terminal 62 as a core. The secondary molded portion 72 is formed by secondary insert molding using the primary molded portion 71 as a core.

The primary molded portion 71 includes first fitting portions 73 that are open forward in the first accommodating space 22. The first end portions 69 of the connection terminals 62 are disposed inside the first fitting portions 73. The first end portions 69 of the two connection terminals 62 are positionally displaced in the vertical direction. The first fitting portions 73 respectively correspond to the first end portions 69 positionally displaced in the vertical direction, and are paired off in the vertical direction in the primary molded portion 71. First housings 74 are fitted to the corresponding first fitting portions 73. First terminals 76 connected to end portions of the respective wiring 75 are accommodated in the first housing 74.

The secondary molded portion 72 includes a second fitting portion 77 that is open upward in the second accommodating space 26. The second end portions 68 of the connection terminals 62 are disposed inside the second fitting portion 77. A second housing 78 is fitted to the second fitting portion 77. A second terminal 80 connected to a lower end portion of a flexible wire 79 is accommodated in the second housing 78.

In addition, the secondary molded portion 72 includes a wall portion 81 standing upward from a position forward of the second fitting portion 77. An upper surface of the wall portion 81 is provided with a housing holding portion 82 having a stepped shape. A retainer 83 that is separate from the main body 63 is attached to the wall portion 81. The retainer 83 is disposed at a position opposite the housing holding portion 82. A lower surface of the retainer 83 has a stepped shape corresponding to the housing holding portion 82. A counterpart housing 84 is disposed between the retainer 83 and the housing holding portion 82.

The counterpart housing 84 is locked to the respective stepped portions of the housing holding portion 82 and the retainer 83, and is held between the housing holding portion 82 and the retainer 83 while being prevented from being dislodged in the front-rear direction. A displacement allowing space 85 that allows the counterpart housing 84 from being displaced in a direction intersecting the front-rear direction is formed between the housing holding portion 82 and the retainer 83. The counterpart housing 84 can be displaced in the displacement allowing space 85, and be oriented so as to be inclined to the front-rear direction.

A counterpart terminal 86 connected to an upper front end portion of the flexible wire 79 is accommodated in the counterpart housing 84. The flexible wire 79, the second terminal 80, the second housing 78, the counterpart terminal 86, and the counterpart housing 84 constitute the relay connector portion 70. The relay connector portion 70 is held by the main body 63 in the second accommodating space 26. The counterpart housing 84 and the second housing 78 are respectively connected to two opposite ends of the flexible wire 79. The flexible wire 79 is bent in a substantially L-shape in a side view at a position that is located rearward of the counterpart housing 84 and above the second housing 78. The counterpart housing 84 causes displacement of the flexible wire 79 when being displaced in the displacement allowing space 85, thus changing the relative position between itself and the second housing 78. This can suppress a stress caused by displacement of the counterpart terminal 86 from being exerted on the connection terminals 62. Note that the counterpart terminal 86 constitutes a connection portion on the connection terminal 62 side to the conductive member 40.

Second Case

The second case 21 is made of metal such as an aluminum alloy, and has the shape of a box having an open lower surface. The second case 21 has a smaller outer shape than the first case 20. In other words, the size of the second case 21 is set to be smaller than the size of the first case 20. As shown in FIGS. 1 and 2, the second case 21 is provided with the second accommodating space 26 that accommodates the relay connector portion 70, the electronic device 25, and the counterpart bus bars. The second case 21 is placed on the attachment wall 23 of the first case 20, and is fastened and fixed to the first case 20 via a fastening member (not shown). The terminal block 60 is covered at the top by the second case 21. The electronic device 25 is attached to an upper wall of the second case 21.

Figure 3:
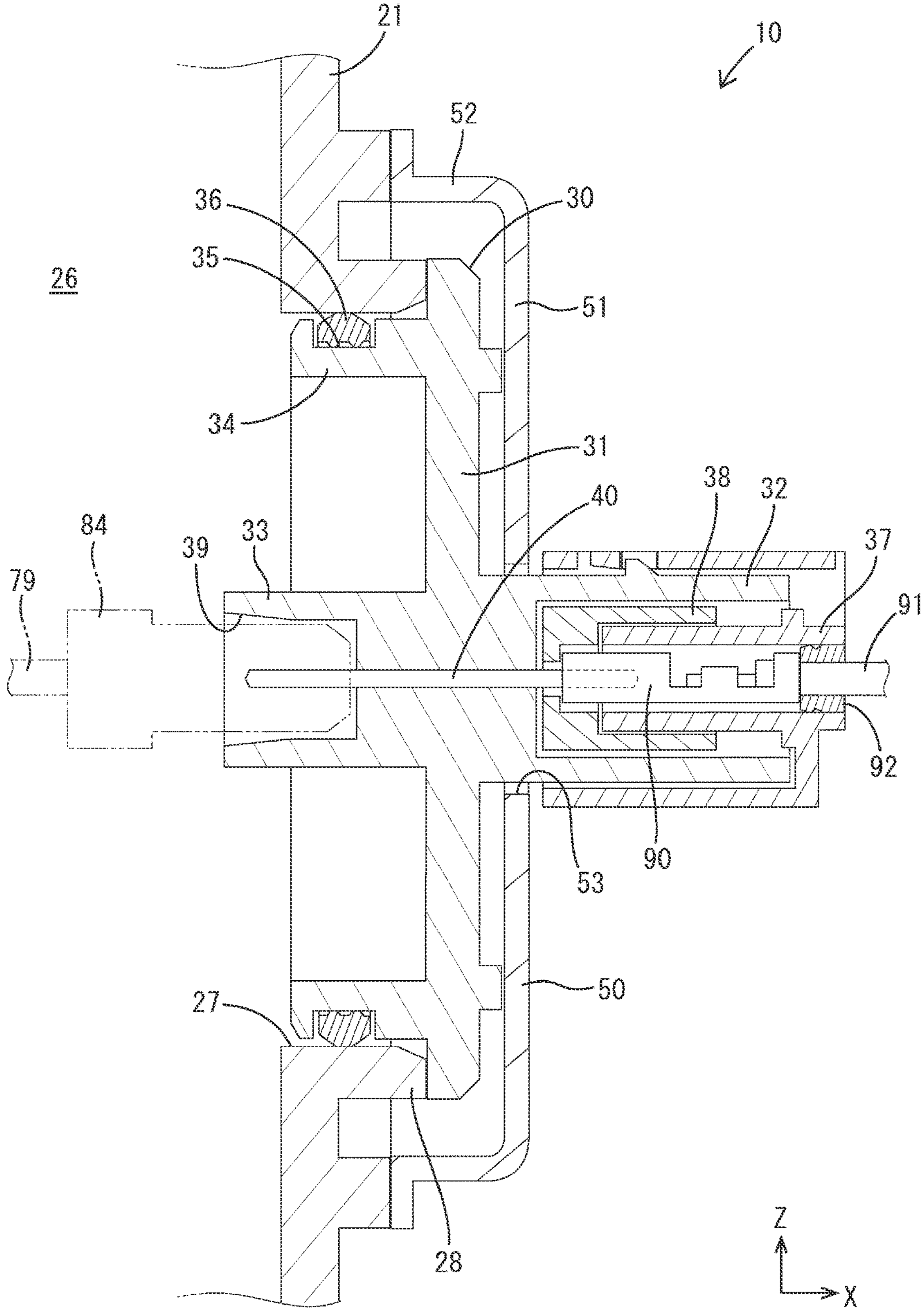
FIG. 3 is an enlarged cross-sectional view showing a state in which a connector is disposed inside a cover, and the cover closes an access hole.

As shown in FIG. an access hole 27 is opened in a front wall of the second case 21. The second accommodating space 26 can be brought into communication with the outside via the access hole 27. The access hole 27 is a hole for a worker to access the bus bars 61 and the counterpart bus bars disposed in the second accommodating space 26 when performing the above-described operation of fastening the bus bars 61 and the counterpart bus bars to each other. As shown in FIG. 3, the access hole 27 is formed on the inner circumference side of the collar-shaped flange portion 28. As shown in FIG. 2, the wall portion 81 and the retainer 83 are disposed rearward of the access hole 27 so as to be close to the access hole 27. The counterpart housing 84 protrudes toward the access hole 27 and waits for a rear fitting portion 33, which will be described later.

Cover

The cover 50 is made of metal such as an aluminum alloy, has a plate shaped, and is fixed so as to span the first case 20 and the second case 21 while closing the access hole 27. As shown in FIG. 3, the cover 50 includes a cover main body 51 disposed extending in the vertical direction and the lateral direction, and a bulging portion 52 protruding rearward from the outer circumference of the cover main body 51. A through hole 53 is formed at the center of the cover main body 51.

Connector

The connector 30 is disposed through the through hole 53 of the cover 50 in the front-rear direction. The connector 30 includes a housing 31 made of synthetic resin, and a conductive member 40 made of metal and held by the housing 31.

As shown in FIG. 3, the housing 31 includes a front fitting portion 32 having a tubular shape that is open forward, a rear fitting portion 33 having a tubular shape that is open rearward, and a circumferential surface portion 34 that surrounds the outer circumference of the rear fitting portion 33. The front fitting portion 32 protrudes forward from the through hole 53 of the cover 50. The rear fitting portion 33 and the circumferential surface portion 34 are disposed inside the cover 50.

The circumferential surface portion 34 is disposed opposite the flange portion 28 of the second case 21 in the access hole 27. A groove portion 35 is recessed in an outer circumferential surface of the circumferential surface portion 34. An annular elastic member 36 made of rubber is fitted into the groove portion 35. The elastic member 36 is sandwiched and held between the circumferential surface portion 34 and the flange portion 28. The elastic member 36 provides a seal between the connector 30 and each of the cases 20 and 21.

An end housing 37 is fitted to the front fitting portion 32 from the front side. A locking member 38 is attached to the end housing 37. Both the end housing 37 and the locking member 38 are made of synthetic resin. An end terminal 90 is accommodated in the end housing 37. The end terminal 90 is electrically connected to a wire 91 of external wiring. A rubber stopper 92 is attached to the wire 91. The rubber stopper 92 provides a seal between the wire 91 and the end housing 37. The locking member 38 locks the end terminal 90, and prevents the end terminal 90 from being dislodged.

The counterpart housing 84 is fitted to the rear fitting portion 33 from the rear side. An inner circumferential surface of the rear fitting portion 33 is provided with a guide portion 39 that flares rearward. The counterpart housing 84 is guided into the rear fitting portion 33 along the guide portion 39.

The conductive member 40 is a pin-shaped or plate-shaped terminal that extends linearly in the front-rear direction. An intermediate portion of the conductive member 40 in the front-rear direction is insert molded or press-fitted to the housing 31. A front end portion of the conductive member 40 is disposed inside the front fitting portion 32. A rear end portion of the conductive member 40 is disposed inside the rear fitting portion 33.

Manufacturing Method and Effects of Terminal Block Unit

In assembling the terminal block unit 10, the first housings 74 are fitted to the corresponding first fitting portions 73, and the first end portions 69 of the connection terminals 62 are connected to the corresponding first terminals 76. The conductors of the motors M are connected to the lower portions of the corresponding bus bars 61. The second housing 78 is fitted to the second fitting portion 77, and the second end portions 68 of the connection terminals 62 are connected to the second terminal 80. The counterpart housing 84 in which the counterpart terminal 86 is accommodated is held between the retainer 83 and the housing holding portion 82. Since the second terminal 80 and the counterpart terminal 86 are connected to each other via the flexible wire 79, a conductive path extending from the motors M to the counterpart terminal 86 via the connection terminals 62 is formed by the above-described step. The main body 63 of the terminal block 60 is attached to the attachment wall 23 while extending through the opening 24.

Subsequently, the second case 21 is placed on the attachment wall 23 of the first case 20. From that state, the operation of fastening bolts and nuts is performed by the worker through the access hole 27, whereby the counterpart bus bars are connected to the upper portions of the corresponding bus bars 61.

Then, the connector 30 is passed through the access hole 27, and the elastic member 36 attached to the circumferential surface portion 34 is brought into close contact with an inner circumferential surface of the flange portion 28. In addition, the cover 50 is fixed to the cases 20 and 21, and the housing 31 is covered by the cover 50 except for the front fitting portion 32. Furthermore, at appropriate timing, the end housing 37 is fitted to the front fitting portion 32, and the front end portion of the conductive member 40 is connected to the end terminal 90.

As the connector 30 is passed through the access hole 27, the rear fitting portion 33 is fitted to the counterpart housing 84, and the rear end portion of the conductive member 40 is inserted into the counterpart terminal 86 in the front-rear direction and connected thereto. In the process of fitting the rear fitting portion 33, the counterpart housing 84 can be displaced in the placement allowing space 85 in a direction intersecting the front-rear direction, while sliding on the guide portion 39. Also, the elastic member 36 is elastically deformed, thus enabling the housing 31 including the rear fitting portion 33 to be also displaced in the direction intersecting the front-rear direction. This can optimize the relative positional relationship between the rear fitting portion 33 of the housing 31 and the counterpart housing 84, thus allowing the rear end portion of the conductive member 40 to reach a position at which it is connected to the counterpart terminal 86. Once the connector 30 has been passed through the access hole 27, and the cover 50 has been attached to the case in this manner, the conductive member 40 and the connection terminal 62 are electrically connectable to each other via the relay connector portion 70.

As described thus far, according to Example 1 of the present embodiment, the connector 30 is disposed inside the cover 50, and it is therefore not necessary to secure a space for accommodating the entire connector 30 inside the second case 21. Consequently, it is possible to realize space saving for the second case 21, thus suppressing an increase in size of the second case 21.

In addition, the connector 30 is passed through the access hole 27 that enables access to the bus bars 61, and it is therefore not necessary to provide a dedicated hole through which the connector 30 is inserted into the cases 20 and 21, thus preventing an increase in complexity of the structures of the cases 20 and 21. Furthermore, the conductive member 40 and the counterpart terminal 86 can be connected to each other at the same time as the connector 30 is passed through the access hole 27, and it is thus possible to increase the ease of assembly.

In Example 1 of the present embodiment, the access hole 27 of the second case 21 is used as an insertion hole for the connector 30, and an insertion hole having a large opening diameter need not be formed in the first case 20 having a large size.

Furthermore, when the cover 50 closes the access hole 27, the relative positional relationship between the rear fitting portion 33 of the housing 31 and the counterpart housing 84 is optimized by the displacement allowing space 85, the guide portion 39, and the elastic member 36, thus allowing the conductive member 40 and the connection terminal 62 to favorably reach a position at which they can be electrically connected to each other.

Example 2

Figure 5:
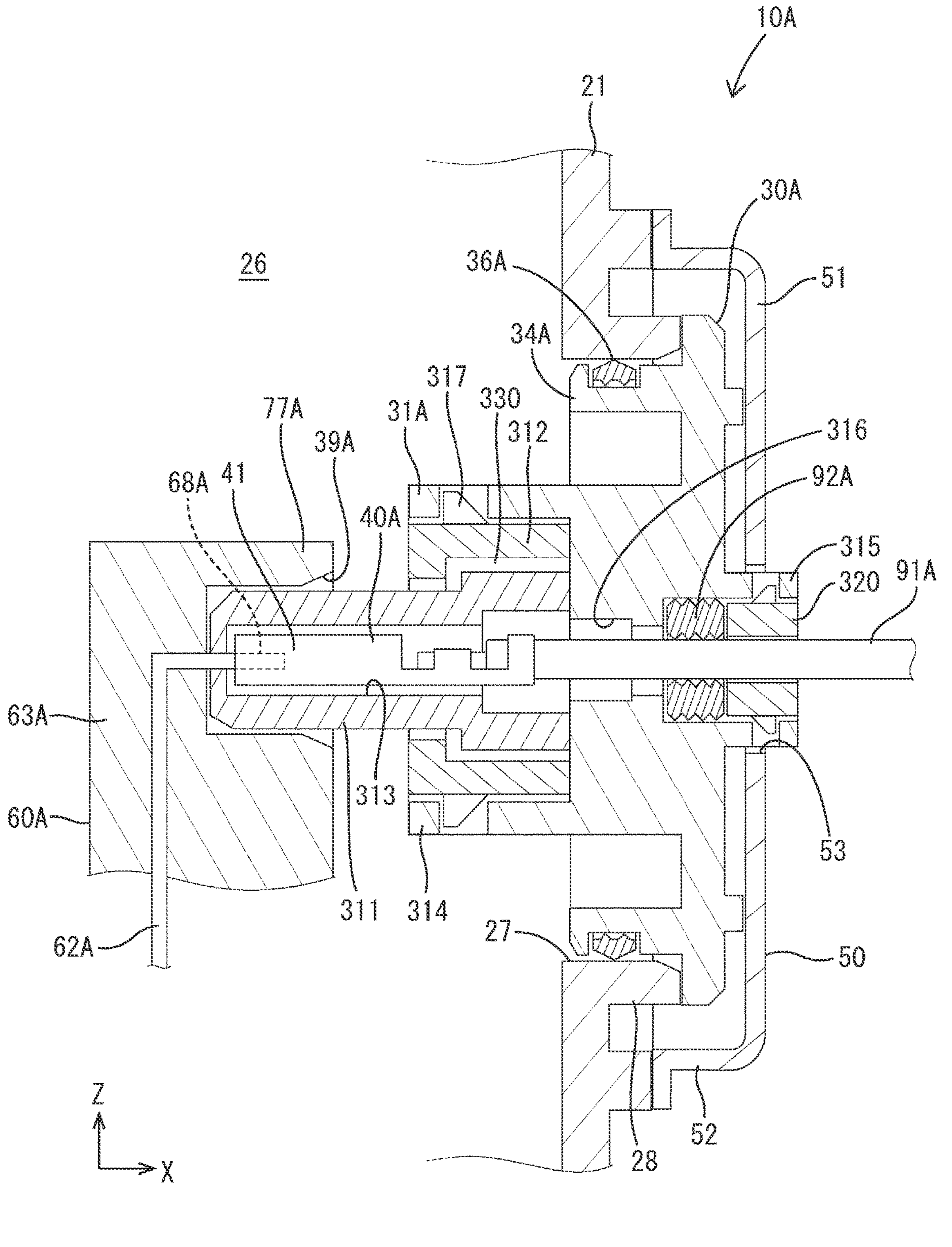
FIG. 5 is an enlarged cross-sectional view showing a state in which a connection terminal and a conductive member are directly electrically connected to each other in a terminal block unit according to Example 2 of the present embodiment.

As shown in FIG. 5, a terminal block unit 10A according to Example 2 of the present embodiment differs from Example 1 with regard to structures of a main body 63A and connection terminals 62A of a terminal block 60A, and a connector 30A including a conductive member 40A. The other structures are the same those of Example 1.

In Example 2, structures that are the same as or corresponding to those in Example 1 are denoted by the same reference numerals, and redundant descriptions thereof have been omitted.

The main body 63A of the terminal block 60A includes a second fitting portion 77A that is open forward in the second accommodating space 26 of the second case 21. An inner circumferential surface of the second fitting portion 77A is provided with a guide portion 39A that flares forward. Each of the connection terminals 62A is substantially L-shaped in a side view, and has a portion extending in the front-rear direction. A front end portion of the connection terminal 62A is formed as a second end portion 68A. The second end portion 68A is disposed inside the second fitting portion 77A. The second fitting portion 77A is open toward the access hole 27 and waits for a terminal holding portion 311, which will be described later.

The connector 30A includes a conductive member 40A, a terminal holding portion 311 that holds the conductive member 40A, a housing 31A having the terminal holding portion 311 disposed thereinside, and a displacement allowing portion 312 interposed between the terminal holding portion 311 and the housing 31A. The terminal bolding portion 311, the housing 31A, and the displacement allowing portion 312 are all made of synthetic resin.

The conductive member 40A is a terminal made of a conductive metal, and includes a connection main body portion 41 at a rear portion thereof. A front portion of the conductive member 40A is crimped and electrically connected to a wire 91A of external wiring.

The terminal holding portion 311 includes a terminal accommodating chamber 313 that extends in the front-rear direction. The conductive member 40A is inserted and accommodated in the terminal accommodating chamber 313 from the front side. The housing 31A includes an accommodating recess 314 having a tubular shape that is open rearward, a circumferential surface portion 34A that surrounds the outer circumference, and a tube portion 315 that protrudes forward. A through hole 316 is formed in a central portion of the housing 31A. A rear end of the through bole 316 is open to a front surface of the accommodating recess 314 on the back side. A front portion of the through hole 316 extends through the inside of the tube portion 315, and a front end thereof is open to a front surface of the housing 31A.

A front portion of the terminal holding portion 311 is accommodated inside the accommodating recess 314. The wire 91A connected to the conductive member 40A is pulled out forward of the housing 31A through the through hole 316. A rubber stopper 92A and a holder 320 are accommodated in the through hole 316. The rubber stopper 92A provides a seal between the wire 91A and the housing 31A. The holder 320 is locked to the tube portion 315, thus preventing the rubber stopper 92A from being dislodged. As in Example 1, an elastic member 36A is attached to the circumferential surface portion 34A.

The displacement allowing portion 312 is cap-shaped, and is accommodated inside the accommodating recess 314. The displacement allowing portion 312 is locked to the accommodating recess 314 via a lock portion 317. In addition, the displacement allowing portion 312 is disposed so as to be able to come into abutment against a stepped portion of the terminal holding portion 311, thus preventing the terminal holding portion 311 from being dislodged rearward A space 330 is formed between an outer circumferential surface of the terminal holding portion 311 that includes the stepped portion, and an inner circumferential surface of the displacement allowing portion 312. The terminal holding portion 311 can be displaced in the space 330 so as to be oriented to be inclined relative to the front-rear direction.

In a state in which the terminal holding portion 311, the housing 31A and the displacement allowing portion 312 are mounted together, a rear portion of the terminal holding portion 311 protrudes rearward from the accommodating recess 314 of the housing 31A. In a state in which the connector 30A is passed through the access hole 27, a rear portion of the accommodating recess 314 is disposed in the second accommodating space 26 of the second case 21. As in Example 1, the elastic member 36A attached to the circumferential surface portion 34A is in close contact with the inner circumferential surface of the flange portion 28. A front portion of the tube portion 315 protrudes forward from the through hole 53 of the cover 50.

As the connector 30A is passed through the access hole 27, the rear portion of the terminal holding portion 311 is fitted inside the second fitting portion 77A, and the second end portion 68A of the connection terminal 62A is inserted into the connection main body portion 41 of the conductive member 40A in the front-rear direction and is electrically connected thereto. In the process of fitting the terminal holding portion 311, the rear portion of the terminal holding portion 311 slides on the guide portion 39A of the second fitting portion 77A, and the terminal holding portion 311 can be displaced in a direction intersecting the front-rear direction within the range of the space 330 formed between itself and the displacement allowing portion 312. In addition, elastic deformation of the elastic member 36A allows the housing 31A to be displaced in the direction intersecting the front-rear direction. This allows the terminal holding portion 311 and the second fitting portion 77A to be appropriately fitted to each other in the front-rear direction, and the second end portion 68A of the connection terminal 62A can reach a position at which it is connected to the conductive member 40A.

As described thus far, according to Example 2 of the present embodiment, the connection terminal 62A and the conductive member 40A are directly electrically connected to each other when the connector 30A is passed through the access hole 27, and the cover 50 is attached to the cases 20 and 21. Accordingly, it is possible to connect the conductive member 40 and the connection terminal 62A to each other at the same time as passing the connector 30A through the access hole 27, thus increasing the ease of assembly. In Example 2 of the present embodiment, the mode in which the terminal holding portion 311 is displaced in the space 330, and hence the mode of displacement of the conductive member 40A can be determined according to the displacement allowing portion 312.

Other Embodiments of the Present Disclosure

It should be appreciated that the embodiment presently disclosed is in all respects illustrative and not limiting.

In the above embodiment, the bus bars and the connection terminals are provided in one main body. However, the bus bars and the connection terminals may be provided in a plurality of main bodies.

In the above embodiment, the cover is separated from the connector. However, the cover may be structured to hold the connector in a single piece therewith.

In the above embodiment, a member that provides a seal between the cover and the connector is not provided therebetween. However, a member that provides a seal between the cover and the connector may be provided therebetween.

In the above embodiment, a thermistor terminal extending in a pin shape or a plate shape is illustrated as the connection terminal. However, the connection terminal is not limited to a thermistor terminal, and may be another sensor terminal or signal terminal. The connection terminal may be a crimped terminal having a barrel, or may have the shape of a bus bar.

In the above embodiment, a first case serving as a motor case and a second case serving as an inverter case are illustrated as the case. However, the case may be a case that accommodates another device such as an electronic device. The case may be a unitary case that cannot be separated into the first case and the second case.

In Example 2 of the above embodiment, the displacement allowing portion is provided between the terminal holding portion and the housing. However, merely a space may be formed between the terminal holding portion and the housing.

The technique relating to the displacement allowing portion of Example 2 of the above embodiment is also applicable to the connector of Example 1.

The invention claimed is:

1. A terminal block unit comprising:
a terminal block;
a case having the terminal block disposed thereinside, wherein:
the terminal block includes a bus bar, a connection terminal that is separate from the bus bar, and a main body that holds the bus bar and the connection terminal, and
the case has an access hole that enables access to the bus bar; and
a cover that closes the access hole, wherein:
the cover includes a connector disposed inside the cover, and
the connector includes a conductive terminal configured to be electrically connected to the connection terminal.

2. The terminal block unit according to claim 1, wherein:
the case includes a first case that supports the main body, and a second case having the access hole formed therein, and the second case is fixed to the first hole-case while covering the main body.

3. The terminal block unit according to claim 2, wherein:
the first case has an opening in an attachment wall to which the second case is fixed,
the main body is disposed through the opening, and
the connection terminal has a first end configured to be connected to wiring accommodated in the first case, and a second end configured to be electrically connected to the conductive terminal.

4. The terminal block unit according to claim 3, wherein:
the connection terminal has an L-shape extending through the main body, and
the second end is disposed opposite the access hole while being exposed from the main body.

5. The terminal block unit according to claim 2,
wherein the second case has a smaller outer shape than the first case.

6. The terminal block unit according to claim 1, wherein:
the connector is disposed through the access hole in a front-rear direction,
the conductive terminal is connected to a connection portion on the connection terminal in the front-rear direction, and at least one of the conductive terminal and the connection portion on the connection terminal is disposed so as to be displaceable in a direction intersecting the front-rear direction.

7. The terminal block unit according to claim 6, wherein an elastic member that is elastically deformable in the direction intersecting the front-rear direction is disposed between the connector and an inner circumference of the access hole in the case.

8. The terminal block unit according to claim 6, wherein:

the connector includes:

a terminal holding portion that holds the conductive terminal;

a housing having the terminal holding portion disposed thereinside; and a displacement allowing portion that is provided between the terminal holding portion and the housing, and that allows the terminal holding portion to be displaced in the direction intersecting the front-rear direction.

9. The terminal block unit according to claim 6, wherein:

the connection portion on a connection terminal side is accommodated in a counterpart housing serving as a fitting counterpart of the connector, and a retainer that holds the counterpart housing so as to be displaceable in the direction intersecting the front-rear direction is attached to the main body.

10. The terminal block unit according to claim 9, wherein:

the connection portion on the connection terminal side is a counterpart terminal that is to be accommodated in the counterpart housing, and the counterpart terminal is connected to the connection terminal via a flexible wire.

11. The terminal block unit according to claim 1, wherein a connection portion on a connection terminal side to the conductive terminal is disposed opposite the access hole.

* * * * *